INVENTORS
ROBERT E. TOUZALIN AND
RUDOLPH R. PATRICK
BY
*Teare, Felger & Teare*
ATTORNEYS Nov. 10, 1964   R. E. TOUZALIN ET AL   3,156,452
MIXING APPARATUS Filed Oct. 10, 1961   3 Sheets-Sheet 3

*INVENTORS*
*ROBERT E. TOUZALIN AND*
*RUDOLPH R. PATRICK*
BY
Jeane, Fetzer & Jeane
ATTORNEYS

United States Patent Office 3,156,452
Patented Nov. 10, 1964

3,156,452
MIXING APPARATUS
Robert E. Touzalin, Aurora, and Rudolph R. Patrick, Warrensville Heights, Ohio, assignors to Interlake Iron Corporation, Cleveland, Ohio, a corporation of New York
Filed Oct. 10, 1961, Ser. No. 144,124
17 Claims. (Cl. 259—135)

This invention relates to an apparatus for mixing large masses of liquid-like materials.

One of the presently existing difficulties in industry, relates to the mixing of various additives to large masses of liquid-like materials such as chemicals and molten metals. In many cases, for example, it is desirable to introduce various additive ingredients to a liquid-like material for the purpose of bringing the liquid to a desired analysis. It is necessary, when adding such ingredients to large liquid-like masses to introduce the ingredients in a manner that will achieve uniformity of analysis throughout the entire mass. Heretofore, when it was desired to mix various ingredients into a liquid-like mass, it was necessary to pour the liquid from one, into frequently two or more vessels in order to attain the proper amount of dispersion of the additive ingredients throughout the entire mass. However, in mixing large masses of liquid-like material this procedure requires the use of large overhead cranes and other such facilities which have proven themselves to be not only costly but require considerable space and maintenance. In the mixing of various ferro alloys such as ferro silicon and ferro manganese with molten pig iron, for example, it has been very difficult, by existing apparatus and procedures, to uniformly mix the alloy additions throughout the entire melt, in order to obtain a desired analysis in the molten pig iron. In addition, the mixing of large masses of chemicals or molten metals by present procedures creates extremely dangerous working conditions for the operator, due to the tendency of the liquid-like masses to splash from within the vessel upon mixing. Furthermore, the erosive effect and high temperatures of large chemical and metal masses results in harmful abrasive action severely limiting the extent to which existing facilities may be successfully utilized to obtain the required mixing action within large liquid-like masses.

A primary object of the present invention, therefore, is to provide an apparatus for mixing large masses of liquid-like material.

A more particular object of the present invention is to provide an apparatus capable of mixing various ingredients uniformly throughout large masses of liquid-like material.

Another object of the present invention is to provide an apparatus for mixing large masses of liquid-like material that is not subject to erosive or abrasive effects of the liquid-like material.

Still another object of the present invention is to provide an apparatus for mixing large masses of liquid-like material that is horizontally swingable and vertically movable into and out of working position relative to the liquid-like mass.

A further object of the present invention is to provide an apparatus for mixing large masses of liquid-like material with an impeller that is not subject to the erosive effects of the liquid-like material and which acts to uniformly mix ingredients within the liquid-like mass.

A still further object of the present invention is to provide an apparatus for mixing large masses of molten metal utilizing a fluid cooled refractory impeller that is not subject to the erosive effects of the molten metal and which acts to uniformly mix alloy ingredients within the molten metal.

An additional object of the present invention is to provide an apparatus for mixing large masses of liquid-like materials that is self-contained and more economical to utilize than has heretofore existed with respect to other facilities for uniformly mixing large masses of liquid-like material.

Further objects and advantages, and other new and useful features in the construction, arrangement and general combinations of elements of the apparatus for mixing large masses of liquid-like material will be apparent to those skilled in the art as the following description proceeds with reference to the accompanying drawings, for purposes of illustration but not of limitation, in which like reference characters designate like parts throughout, and in which.

Briefly, in accordance with the objects of the present invention, a thrust bearing column may be supported for rotational movement about its vertical axis within a bearing pedestal. Rotation of the thrust bearing column may be accomplished by means of a fluid-pressure means that is adapted to rotate the thrust bearing column about its vertical axis. The thrust bearing column is provided with a horizontally disposed carriage that is swingable into and out of working position upon rotation with the thrust bearing column and which may move vertically with respect to the thrust bearing column by means of horizontally disposed rotatable means mounted on the carriage and adapted to be slidably engaged within the thrust bearing column.

Vertical movement of the carriage on the thrust bearing column may be accomplished by providing a rotatable upstanding means operably mounted on the carriage and engageably connected to a first motor means operably mounted on the thrust bearing column. Driving means operably supported on the carriage are adapted to rotatably engage a stirring rod upon actuation of a second motor means operably mounted on the carriage. An impeller may be removably connected to the stirring rod and adapted to impart a uniform mixing action to a large liquid-like mass upon being lowered into a suitable vessel located beneath the carriage.

In addition, a cooling means may be provided within the stirring rod and impeller which is adapted to maintain the temperature of large liquid-like mass sufficiently low to prevent erosion of the refractories with resultant contamination of the liquid-like mass.

Figure 1:
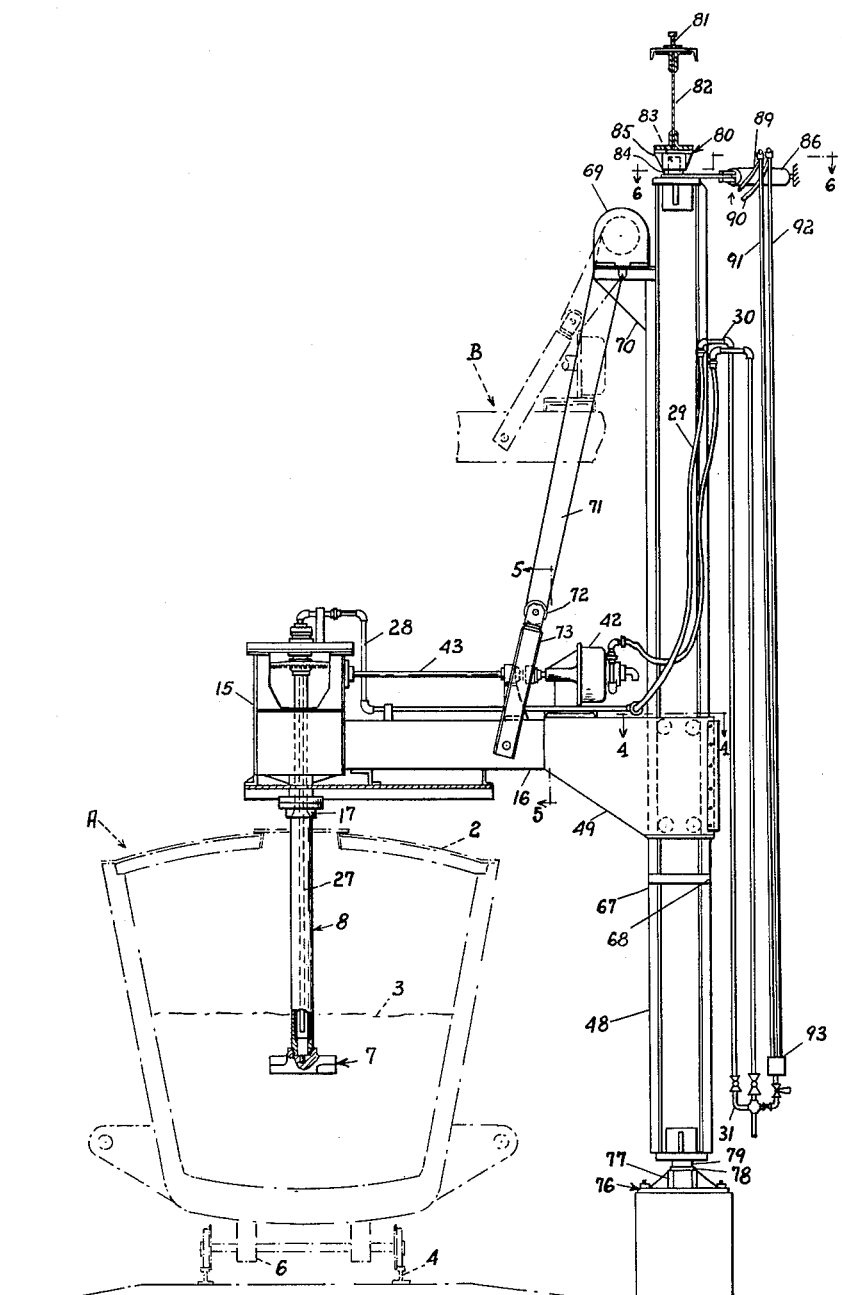
FIG. 1 is a side elevational view showing the apparatus for mixing large masses of liquid-like material in working position and illustrating in phantom lines the raised or non-working position of the carriage when out of a vessel.

Referring now more particularly to FIGS. 1 through 6, a ladle car, shown generally at A, including a refractory ladle with a removable cover is shown by the dotted line 2 at FIG. 1. The refractory ladle may contain a liquid-like material, such as molten iron, as shown at 3. The ladle car 1 has a horizontal base portion 6 which may be mounted for movement on rollers 5 and guided by suitable rails 4. An impeller 7, comprised preferably of carbon or of a refractory material containing carbon, mounted for horizontal rotation about its vertical axis adjacent the bottom of a stirring rod may be shown generally at 8.

The impeller 7, which may be rectangularly shaped, may be provided with a generally helical fluted portion 9 to impart a greater stirring action to the melt within the ladle 1. An upstanding neck portion 10 extends from the top surface of the impeller 7 and provided through its vertical axis with a first bore portion 11 which may be threaded on its interior, as shown at 12. A second bore portion 13, of smaller diameter, extends concentrically downwardly from the first bore portion 11 and may be threaded on its interior, as shown at 14. Stirring rod 8, may be connected to a gear housing 15 which may be mounted on a carriage 16 by means of a split coupling, shown generally at 17. Stirring rod 8 comprises a cylindrical sleeve or collar 18 preferably of carbon or of a refractory material containing carbon, and best shown at FIG. 2. The refractory sleeve 18 may be threaded adjacent its lower end, as shown at 19, to fit within the first threaded bore portion 11 provided within the impeller 7. A shaft or tube 20, preferably of steel, fits tightly within the carbon sleeve 18 and may be threadably connected at 21 within a lower flange 22 of the split coupling 17. The shaft 20 is preferably wrapped with an asbestos-tape, soaked in a suitable refractory cement, shown at 23, in order to insulate the shaft against the abrasive effects of the liquid-like material. The lower end of the shaft 20 may be provided with a plug 24, preferably of steel, inserted into its end, welded in place, and machined as an integral part of the shaft 20. The body, of the plug 24 may be provided adjacent its lower end with a threaded cylindrical projection 25 which fits into the second threaded bore portion 13 provided in the impeller 7. The plug 24, is preferably provided with an elongated cylindrical cooling channel or grove 26 which extends downwardly into the bottom of the plug 24 to form a downwardly extending apex 26a adjacent the bottom portion of the plug.

To cool the stirring rod 8, thus preventing contamination of the liquid-like material through possible erosion of the refractories, a cylindrical pipe 27, preferably of stainless steel, may be mounted concentrically within the shaft 20 to a point slightly above the plug 24. The cylindrical pipe 27 is preferably of a smaller diameter than the shaft 20 to allow a cooling fluid emanating from the pipe to be freely circulated along the walls within the shaft 20. Cooling fluid, thus emitted from the cooling pipe 27, will also enter the cooling channel 26 of the plug 24 to maintain the temperature adjacent the lower end of the steering rod 8 sufficiently low to prevent erosion of the refractories.

Cooling fluid is preferably introduced into the cooling pipe 27 by means of a conduit 28 supported on the gear housing 15. In such case the conduit 28 is connected to a flexible hose 29, preferably of metal, which may be attached to a second conduit 30 leading to a suitable fluid compressor, not shown. A valve 31 may be provided in a conduit 30, to control the flow of fluid to the cooling pipe 27 within the steering rod 8. Any suitable cooling fluid, such as air, may be utilized within the cooling pipe 27 to maintain the temperature sufficiently low to prevent distortion, or erosion of the refractories.

Figure 3:
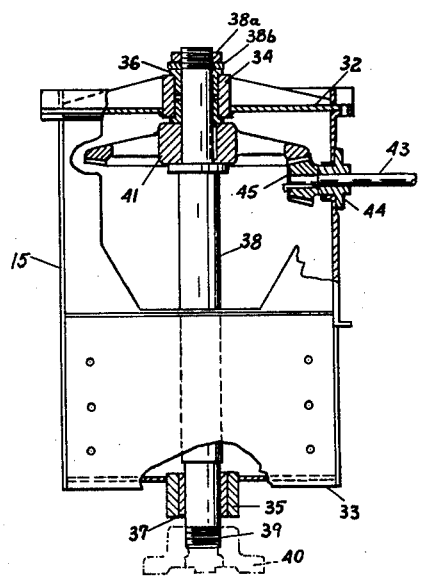
FIG. 3 is an enlarged elevational view with parts cut away and partially in section illustrating the gear housing assembly of the present invention.

To attain a desired rotation of the impeller 7 within the ladle 1, the cylindrical gear housing 15, shown at FIG. 3, may be operatively connected to a drive motor 42 supported on a carriage 16. In such case, the cylindrical gear housing 15 may be provided with top 32 and bottom plates 33, with upstanding bearing collar portions 34 and 35 disposed concentrically along the vertical axis of the cylindrical gear housing 15. A pair of bronze-graphitized bushings 36 and 37 may be removably inserted into the upstanding bearing collars and in vertical alignment therewith. A drive shaft 38, preferably of steel, extends along the vertical axis of the cylindrical gear housing 15 and may be rotatably supported therein by means of the bronze-graphitized bushings 36 and 37. The drive shaft 38 is preferably threaded adjacent its lower end, as shown at 39, to receive the top flange 40 of the split coupling 17. Drive shaft 38 is preferably provided adjacent its top with a lock nut 38a and steel washer 38b keyed to the shaft to prevent withdrawal of the shaft 38 from within the cylindrical gear housing 15. A right angle bevel gear 41, may be welded or otherwise connected to the drive shaft 38 for rotational movement with the shaft about the vertical axis of the cylindrical gear housing 15.

Figure 2:
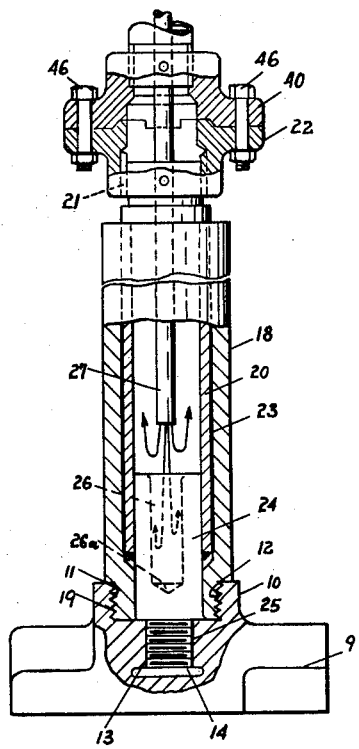
FIG. 2 is an enlarged fragmentary elevational view partially in section illustrating the stirring rod and impeller assembly of the present invention.

Motive power from the drive motor 42, mounted on the carriage 16 may be transferred to the bevel gear 41 by means of a pinion shaft 43, that extends from the drive motor 42 into the cylindrical gear housing 15. A bronze-graphitized bushing 44, is preferably disposed within the wall of the cylindrical gear housing 15 and rotatably supports the pinion shaft 43 therein. A pinion gear 45, within the gear housing and connected to the end of the pinion shaft 43, may be disposed to engage the bevel gear 41, and upon actuation of the drive motor 42 a rotational force is imparted to the top flange 40 of the split coupling 17. In operation, when it is desired to stir the liquid-like material within the ladle, the impeller 7 and stirring rod 8 may be connected to the drive shaft by means of split coupling 17. This is accomplished simply by joining the top and bottom flanges 40 and 22 of the split coupling 17, respectively together, preferably by means of suitable bolts 46, as shown at FIG. 2.

Figure 4:
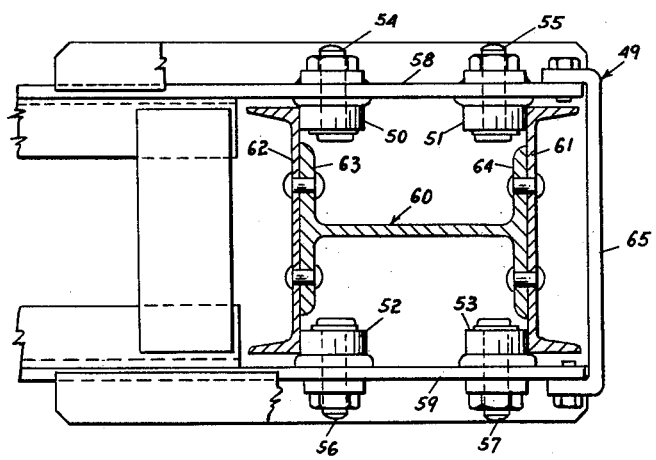
FIG. 4 is an enlarged vertical cross-sectional view taken along lines 4—4 of FIG. 1, illustrating the carriage and bracket assembly.
Figure 5:
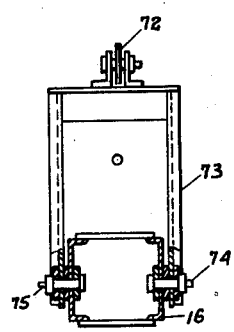
FIG. 5 is a vertical cross-sectional view taken along lines 5—5 of FIG. 1, illustrating the sheave assembly mounted on the carriage.

The carriage 16 may be mounted for vertical up-and-down movement on a thrust bearing column 48 by means of bracket housing 49 bolted or otherwise secured to the carriage. The bracket housing 49 is preferably provided with four single flanged wheels (50, 51, 52, 53) disposed for rotational movement about their horizontal axes. Bolts (54, 55, 56, 57) act as axles and extend through the side plates 58 and 59 of the bracket housing 49, as shown at FIG. 4, to rotatably support the single flanged wheels. The vertical thrust bearing column 48 is preferably in the form of a metal I-beam 60 with two longitudinally extending metal flanges 61 and 62 riveted or otherwise connected to the outer legs 63 and 64 of the I-beam.

To provide for vertical movement of the carriage 16 relative to the vertical thrust bearing column 28, the bracket housing 49 may be mounted to enclose the column. This may be accomplished by means of an end plate 65, which is bolted or otherwise connected to each of the side plates 58 and 59, thus enclosing the bracket housing 49 around the vertical thrust bearing column 48. In this manner, the single flanged wheels extending from the side plates 58 and 59 may rotatably engage the back surface 56 of the two longitudinally extending metal flanges 61 and 62, which thus act as guiding tracks for the single flanged wheels.

It is preferable, when mixing large masses of liquid-like material, to prevent further downward movement of the bracket housing 49 after the stirring rod 8 and impeller 7 have reached a predetermined height within the refractory ladle 1. This may be accomplished by providing suitable stop means 67 and 68, in the form of metal projections, mounted on the two longitudinally extending metal flanges 61 and 62 of the I-beam 60, which act to arrest further downward movement of the carriage 16 relative to the vertical thrust bearing column 48.

Vertical movement of the carriage 16 carrying the rotatable impeller 7 may be accomplished by providing the vertical thrust bearing column 48 adjacent its upper end with a base mounted hoist 69 of about 3000 pound capacity. The base mounted hoist may be supported on the thrust bearing column by means of an arm 70, which is preferably welded or otherwise attached to the vertical thrust bearing column. A rope 71, preferably of a wire-like material, such as steel, may be extended from the base mounted hoist 69 to a sheave 72, preferably of iron, which is rotatably disposed in a U-shaped sheave arm 73, best shown at FIG. 5. Sheave arm 73 may then be mounted on carriage 16 for rotational movement about a horizontal axis by means of axles 74 and 75 which extend through the side wall portions of the carriage 16. Thus, when the rope 71 is taken up on actuation of the base mounted hoist 69, the carriage 68 will move to an extreme uppermost position to thereby lift the impeller 7 from within the ladle or vessel, as shown generally by the phantom lines at B.

The vertical thrust bearing column 48 may be mounted for rotation about its vertical axis in a thrust bearing pedestal 76 bolted or otherwise supported on the floor of the plant. The pedestal 76 may be provided with an upstanding collar 77, which acts to receive a bronze-graphitized bushing 78. The thrust bearing column 48 may be supported within the pedestal by means of a vertically extending thrust bearing axle 79 that slidably fits within the bushing 78 of the pedestal. The upper end of the vertical thrust bearing column 48 may be provided with a similar top bearing pedestal 80, that may be removably supported on a monorail 81 or otherwise removably supported from the roof of the plant by means of a crane girder 82. A top bearing axle 83 extends vertically from the top of the column, and rotatably fits within a bronze-graphitized bushing 84, provided in an upstanding bearing collar 85 on the top bearing pedestal 80.

Figure 6:
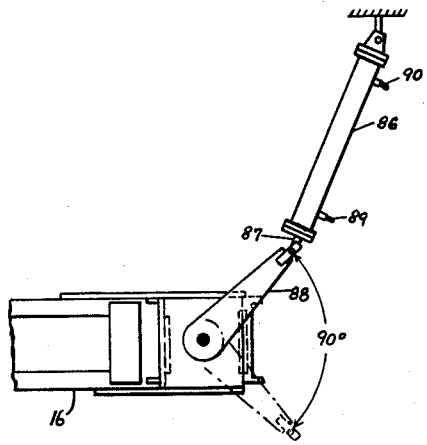
FIG. 6 is a plan view of the cylinder and piston assembly looking in the direction of the plane indicated by the line 6—6 of FIG. 1 for swinging the carriage into and out of working position and vice versa.

Rotation of the vertical thrust bearing column 48 about its vertical axis, within the bushings, may be accomplished by actuating the top bearing axle 83 by means of a double-acting fluid cylinder 86, which may be rotatably supported from the roof of the plant, best shown at FIG. 6. The piston 81, within the cylinder, may be movably fastened to a clevis arm 88 which is preferably welded or otherwise connected to the top bearing axle 83 above the vertical thrust bearing column 48. The fluid cylinder 86 may be provided with a pair of flexible hose connections 89 and 90, preferably of metal, which when attached to the conduits 91 and 92, supply fluid pressure to the cylinder from a suitable compressor, not shown. Actuation of the cylinder 86 may be controlled by a four-way valve 93 located in the conduits 91 and 92. The view illustrated by FIG. 6 shows the carriage 16 to be in a working position when the piston 87 within the cylinder 86 is retracted. Forward movement of the piston 87 within the cylinder 86 upon actuation of the four-way valve 93 causes the clevis arm 88 and the vertical thrust bearing column 48 to rotate clockwise 90° about its vertical axis to move the carriage 16 carrying the impeller 7 out of alignment or into a non-working position with respect to the ladle 1. When in this non-working position the ladle 1 may be moved to another station and a new ladle brought into position, whereupon the piston 87 within the cylinder 86 is again actuated by means of the four-way valve 93 to rotate the carriage counter-clockwise 90° into a working position over a new ladle which has been brought into position beneath the carriage.

In operation, it may be desirable to replace the refractory portion of the stirring rod and the impeller, due to the prolonged exposure to the heat generated by the mass of liquid-like material. This may be simply accomplished by loosening the bolts 46 of the split coupling 17 and removing the bottom flange 22 of the split coupling which carries as a unit the shaft 20, refractory sleeve 18, plug 24 and impeller 7. Refractory sleeve 18 and impeller 7 may be then removed from the shaft 20 by exerting a downward force on the impeller 7 which slides the plug 24 downwardly from within the shaft 20. The downward force exerted on the refractory sleeve 18 tends to loosen the asbestos-tape surrounding the shaft 20, thus facilitating removal of refractory portions from the shaft 20. The shaft 20 may again be wrapped with an asbestos-tape and soaked in a suitable cement, and a new refractory sleeve and impeller inserted on the shaft 20. This is accomplished by inserting the plug 24 upwardly into a tight-fitting relation with respect to the shaft 20. The shaft 20 may then be connected to the cylindrical gear housing 15 of the mixing apparatus by bolting together the lower and upper flanges 22 and 40, respectively, of the split coupling 17.

While the refractory impeller of the instant invention has been illustrated as defining a general rectangular configuration with helical fluted portions, it will be understood that other configurations can be utilized, such as circles, squares, etc., which would impart a uniform mixing action to a large mass of liquid-like material.

The foregoing description of the apparatus for mixing large masses of liquid-like material, is apparent that its application results in many significant advantages. Due to the vertical movement of the carriage into and out of working position relative to a vessel it is now possible to continuously introduce additive ingredients into large masses of liquid-like material without interruption.

As a further advantage, the swinging and vertical movement of the carriage into and out of working position and vice versa facilitates storage and handling of the apparatus, thus resulting in substantially economic savings.

As a still further advantage, the apparatus may be provided with a refractory stirring rod and impeller comprised of a material, such as carbon, which greatly reduces the abrasive effects when mixing large masses of liquid-like material, such as molten iron.

As an additional advantage, the apparatus may be provided with a refractory stirring rod and impeller which are maintained at a temperature sufficiently low to prevent erosion of refractories when mixing large masses of liquid-like material, such as molten iron.

As another advantage, the apparatus may be provided with an impeller of configuration that acts to uniformly mix additive ingredients throughout the entire mass of liquid-like material.

The terms and expressions which have been used are terms of description and not of limitation, and there is no intention in the use of such terms and expressions of excluding any equivalents of the feature shown and described or portions thereof, but it is recognized that various modifications are possible within the scope of the invention claimed.

We claim:

1. An apparatus for mixing large masses of liquid-like material comprising, an upstanding column mounted for rotation about a generally vertical axis, power means for rotating the column about said vertical axis, a transversely extending support member operably connected to said column for vertical movement on said column and for rotational movement as a unit with said column upon actuation of said power means, a generally vertically extending mixing means disposed adjacent one end of said support member, motor means mounted on said support member and operably connected to said mixing means for rotating the latter about a generally vertical axis, and cooling means disposed interiorly within said mixing means for applying a coolant to said mixing means from a source of supply.

2. An apparatus in accordance with claim 1, wherein said mixing means includes an elongated hollow shaft extending downwardly from said support member, a sleeve disposed exteriorly on said shaft, and a transversely extending impeller means detachably connected adjacent one end of said sleeve for uniformly mixing said liquid-like material.

3. An apparatus in accordance with claim 2, wherein said cooling means includes an elongated hollow pipe disposed within said shaft, said pipe being connected at one end to a source of coolant and being open at its other end for distributing coolant from said source of supply interiorly of said shaft.

4. An apparatus in accordance with claim 2, wherein said sleeve and impeller are composed of a refractory material such as carbon.

5. An apparatus in accordance with claim 3, including an elongated metal plug disposed interiorly adjacent one end of said shaft and extending downwardly therefrom into said impeller means, said plug being spaced from the open end of said pipe and having a cavity for receiving coolant therein from said source of supply.

6. An apparatus for mixing large masses of liquid-like material, comprising an upstanding column mounted for rotation about its vertical axis, fluid pressure means operably connected to said column, a transversely extending support member operably connected to said column for vertical movement relative to said column and for rotational movement in a generally horizontal plane with said column upon actuation of said fluid pressure means, first motor means mounted on said column and operably connected to said support member for moving the latter vertically relative to said column, a generally vertically extending mixing means disposed adjacent one end of said support member and adapted to be received within a liquid containing receptacle upon movement of said support member, a second motor means mounted on said support member and operably connected to said mixing means for rotating the latter about a vertical axis.

7. An apparatus in accordance with claim 6, including cooling means disposed within said mixing means for supplying coolant to said mixing means.

8. An apparatus in accordance with claim 6, wherein said mixing means includes an elongated hollow shaft extending downwardly from said support member, a sleeve disposed exteriorly on said shaft, and a transversely extending impeller means detachably connected adjacent one end of said sleeve for uniformly mixing liquid-like materials in said receptacle.

9. An apparatus in accordance with claim 8, wherein said cooling means includes an elongated pipe disposed vertically within said shaft, said pipe being connected at one end to a source of coolant and being opened at its other end for distributing coolant from said source of supply interiorly of said shaft, and an elongated metal plug disposed interiorly adjacent one end of said shaft and extending downwardly therefrom into said impeller means, said plug being spaced from the open end of said pipe and having a cavity for receiving coolant therein from said source of supply.

10. An apparatus in accordance with claim 8, wherein said sleeve and impeller means are composed of a refractory material, such as carbon.

11. An apparatus for mixing large masses of molten metal, comprising an upstanding column mounted for rotation about its vertical axis, fluid pressure means operably connected to said column, a transversely extending support member operably connected to said column for rotational movement in a generally horizontal plane with said column upon actuation of said fluid pressure means, said support member being provided adjacent one end thereof with rotatable means rollably engaged on said column for vertical movement of said support member relative to said column, first motor means mounted on said column and operably connected to said support member for moving the latter vertically relatively to said column, generally vertically extending mixing means mounted adjacent one end of said support member and adapted to be received within a molten metal containing receptacle upon movement of said support member, a second motor means mounted on said support member and operably connected to said mixing means for rotating the latter about a vertical axis, and cooling means disposed within said mixing means for supplying coolant to said mixing means.

12. An apparatus in accordance with claim 11, wherein said mixing means includes a gear unit disposed on said support member, said gear unit including bevel and pinion gears operably connected to said motor means and to a first hollow drive shaft extending through said gear unit, a second hollow drive shaft detachably coupled to said first drive shaft and extending downwardly from said support member, a refractory sleeve disposed exteriorly on said second drive shaft, and a transversely extending refractory impeller detachably connected adjacent the bottom of said refractory sleeve for uniformly mixing large masses of molten metal.

13. An apparatus in accordance with claim 12, including a refractory tape-like material disposed intermediate said second drive shaft and said refractory sleeve for securing the latter to said shaft and for insulating the coolant therein from said molten metal.

14. An apparatus in accordance with claim 12, wherein said cooling means includes an elongated hollow pipe disposed within said first and second drive shafts, said pipe being connected at one end to a source of coolant and being open at its other end for distributing coolant interiorly of said shafts, and an elongated metal plug disposed interiorly adjacent one end of said second shaft and extending downwardly therefrom into said refractory impeller, said plug being spaced from the open end of said pipe and having an axially extending cavity for receiving coolant therein from said source of supply.

15. An apparatus for mixing large masses of molten metal, comprising an upstanding column mounted for rotation about its vertical axis, a transversely extending support member operably connected to said column for vertical movement relative to said column and for rotational movement with said column, a gear unit disposed adjacent one end of said support member and operably connected to a motor means mounted on said support member, an elongated hollow shaft detachably coupled to said gear unit and adapted for rotation about a vertical axis upon actuation of said motor means, a refractory sleeve disposed exteriorly on said shaft, a transversely extending refractory impeller detachably connected adjacent the bottom of said sleeve for imparting the uniform mixing action to said molten metal upon actuation of said motor means, and an elongated hollow pipe disposed within said shaft connected at one end to a source of coolant and open at its other end for distributing coolant from said source of supply interiorly of said shaft.

16. An apparatus in accordance with claim 15, including an elongated metal plug disposed interiorly adjacent the bottom of said shaft and extending downwardly therefrom into said refractory impeller, said plug being spaced from the open end of said pipe and having an axially extending cavity for receiving coolant from said source of supply.

17. An apparatus in accordance with claim 16, wherein a refractory tape-like material is disposed intermediate said shaft and said sleeve for securing the latter to said shaft and for insulating the coolant from said molten metal.

References Cited in the file of this patent

UNITED STATES PATENTS

| | | |
|---|---|---|
| 1,598,400 | Simmonds | Aug. 31, 1926 |
| 2,441,727 | Snow | May 18, 1948 |
| 2,982,522 | Hamilton et al. | May 2, 1961 |